(12) United States Patent
Klingman, Jr.

(10) Patent No.: US 9,439,543 B1
(45) Date of Patent: Sep. 13, 2016

(54) PORTABLE AVIATION LAVATORY SERVICE APPARATUS

(71) Applicant: Gerard James Klingman, Jr., Tyler, TX (US)

(72) Inventor: Gerard James Klingman, Jr., Tyler, TX (US)

(*) Notice: Subject to any disclaimer, the term of this patent is extended or adjusted under 35 U.S.C. 154(b) by 294 days.

(21) Appl. No.: 14/194,141

(22) Filed: Feb. 28, 2014

Related U.S. Application Data

(60) Provisional application No. 61/771,908, filed on Mar. 3, 2013.

(51) Int. Cl.
*A47K 17/00* (2006.01)
*B67D 7/32* (2010.01)
*B08B 3/04* (2006.01)

(52) U.S. Cl.
CPC ............... *A47K 17/00* (2013.01); *B08B 3/04* (2013.01); *B67D 7/3209* (2013.01)

(58) Field of Classification Search
CPC ............ E03D 1/00; E03D 3/12; B08B 3/04; B67D 7/3209
USPC ............ 141/2, 86; 220/360; 137/899; 4/342
See application file for complete search history.

(56) References Cited

U.S. PATENT DOCUMENTS

| | | | |
|---|---|---|---|
| 3,327,323 A | 6/1967 | Miller | |
| 4,251,241 A * | 2/1981 | Bothun | A47L 7/0019 15/353 |
| 4,360,947 A * | 11/1982 | DeCosa | A47L 7/0071 15/323 |
| 4,756,349 A | 7/1988 | Atkins | |
| 4,769,860 A | 9/1988 | Sargent et al. | |
| 5,031,249 A | 7/1991 | Sargent | |
| 5,346,245 A | 9/1994 | Budrow et al. | |
| 5,387,053 A * | 2/1995 | Williamson | A47L 9/0063 15/323 |
| 5,660,338 A | 8/1997 | Emmerson | |
| 5,950,251 A * | 9/1999 | Cost | A47K 11/00 141/314 |
| 6,047,736 A * | 4/2000 | Chiocchio | B60R 15/00 137/899 |
| 6,047,842 A * | 4/2000 | Feidt | B25H 3/026 206/510 |
| 6,129,117 A * | 10/2000 | Eriksson | B60R 15/00 137/899 |
| 6,210,457 B1 * | 4/2001 | Siemers | B01D 45/16 55/429 |
| D490,138 S | 5/2004 | Fritz | |
| 6,755,207 B1 * | 6/2004 | Curtis | F04F 3/00 137/205 |
| 6,898,821 B1 * | 5/2005 | Bisbee | A47L 7/0071 15/347 |
| 8,672,177 B2 * | 3/2014 | Hall | G01F 23/58 137/279 |
| 2005/0257340 A1 * | 11/2005 | Parrott | A47L 5/365 15/353 |
| 2005/0287658 A1 * | 12/2005 | Williams | E03C 1/126 435/264 |
| 2006/0124075 A1 * | 6/2006 | Matsumoto | A01K 13/001 119/601 |
| 2010/0147087 A1 * | 6/2010 | Secord | G01N 1/04 73/863.86 |
| 2011/0197855 A1 * | 8/2011 | Johnson | F02M 37/00 123/445 |
| 2013/0085652 A1 * | 4/2013 | McGuffin | F02D 41/266 701/101 |

* cited by examiner

*Primary Examiner* — Timothy L Maust
(74) *Attorney, Agent, or Firm* — Guy V. Manning

(57) ABSTRACT

A compact, self-contained servicing apparatus for onboard lavatories on private aircraft and other vehicles comprises a reservoir container with a lid coupled to a flexible hose bearing a standard lavatory clean-out coupling on its opposite end. The coupling mates with a clean-out port beneath the lavatory of the vehicle. The hose permits contents of the onboard lavatory to flow under gravity into the container. The device includes a rinse bucket for pouring rinse water through the lavatory and for refilling the lavatory with disinfect and fluid. The device also optionally contains gloves, goggles, towels and other supplies used in the self-service process, and a second lid seals the container for transporting lavatory effluent to a disposal area. In one embodiment, the components of the apparatus nest within the container to form a service kit that stores onboard the vehicle when it is not in use.

11 Claims, 5 Drawing Sheets

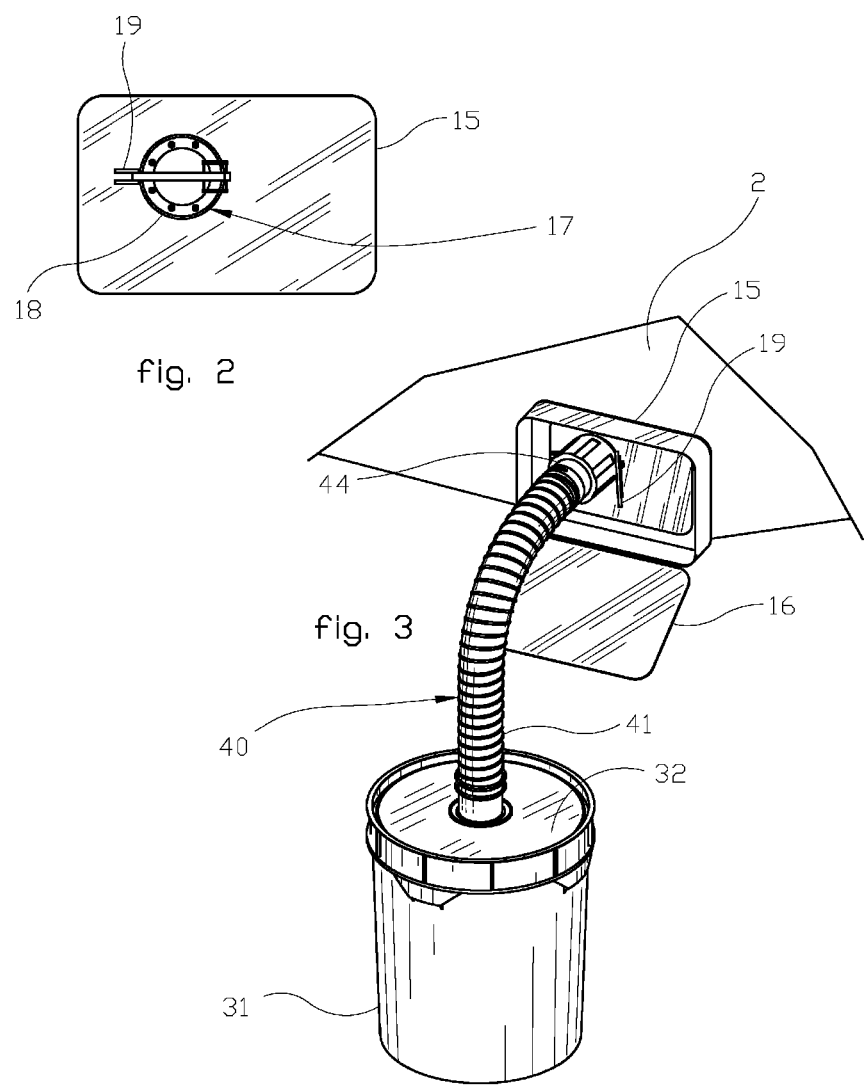

PORTABLE AVIATION LAVATORY SERVICE APPARATUS

BACKGROUND OF THE INVENTION

1. Field of the Invention

This invention relates generally to light to medium-sized, usually private or corporate aircraft, and particularly to such aircraft having onboard lavatories. More particularly, this invention relates to a light-weight, compact, self-contained apparatus containing tools and supplies for cleaning onboard lavatories for private aircraft.

2. Description of Related Art

Virtually all pubic and most of the larger private airports provide services and facilities for cleaning lavatories onboard constituent aircraft. These usually include at least a dumping place and supply of water for the aircraft operator to self-service the aircraft's onboard lavatory. More remote and smaller airports and private, often unmanned landing strips, however, likely have no such facilities, leaving the aircraft operator either unsanitarily and usually illegally to dump the onboard lavatory or to disable it and discontinue its use until the aircraft reaches an airport having the needed facilities. A need exists for means for operators of light aircraft to self-service onboard lavatories when airport facilities are not available.

Many devices exist for servicing lavatories onboard aircraft, recreational vehicles (RV's) and the like. Most, however, are large, heavy and designed for commercial or multiple-vehicle servicing. None are compact, light weight and adapted to be stored and carried onboard private aircraft wherein both weight and storage volume are very important factors. A need exists for a compact, light weight device for servicing private aircraft lavatories under the above circumstances, the device preferably being in kit form and sized for a single use contingency but containing the necessary couplings and chemicals for a complete aircraft lavatory service.

SUMMARY OF THE INVENTION

A compact, self-contained servicing apparatus for onboard lavatories on private aircraft comprises a reservoir container equipped with a lid which couples to the proximate end of a flexible hose bearing a standard lavatory clean-out coupling on its distal end. The clean-out coupling mates directly to a clean-out port conventionally provided beneath the lavatory of the aircraft. The hose permits the contents of the onboard lavatory to flow under gravity through the hose into the container. The device further includes a rinse bucket for pouring water through the lavatory to rinse it out and for refilling the lavatory with disinfectant fluid. The device also may contain gloves, goggles, towels and other supplies optionally used in the self-service process, and a second lid that seals the container for transporting lavatory effluent to a disposal area. In one embodiment, the components of the apparatus nest within the container to form a service kit that stores onboard the aircraft when it is not in use.

BRIEF DESCRIPTION OF THE DRAWINGS

The novel features believed characteristic of the present invention may be set forth in appended claims. The invention itself, however, as well as a preferred mode of use and further objects and advantages thereof, will best be understood by reference to the following detailed description of an illustrative embodiment when read in conjunction with the accompanying drawings, wherein:

FIG. 2 details in elevational view the aircraft clean-out port of the aircraft of FIG. 1.

FIG. 3 shows the present invention in use and resting beside the aircraft of FIG. 1 and coupled to the clean-out port of FIG. 2.

DESCRIPTION OF A PREFERRED EMBODIMENT

Figure 1:
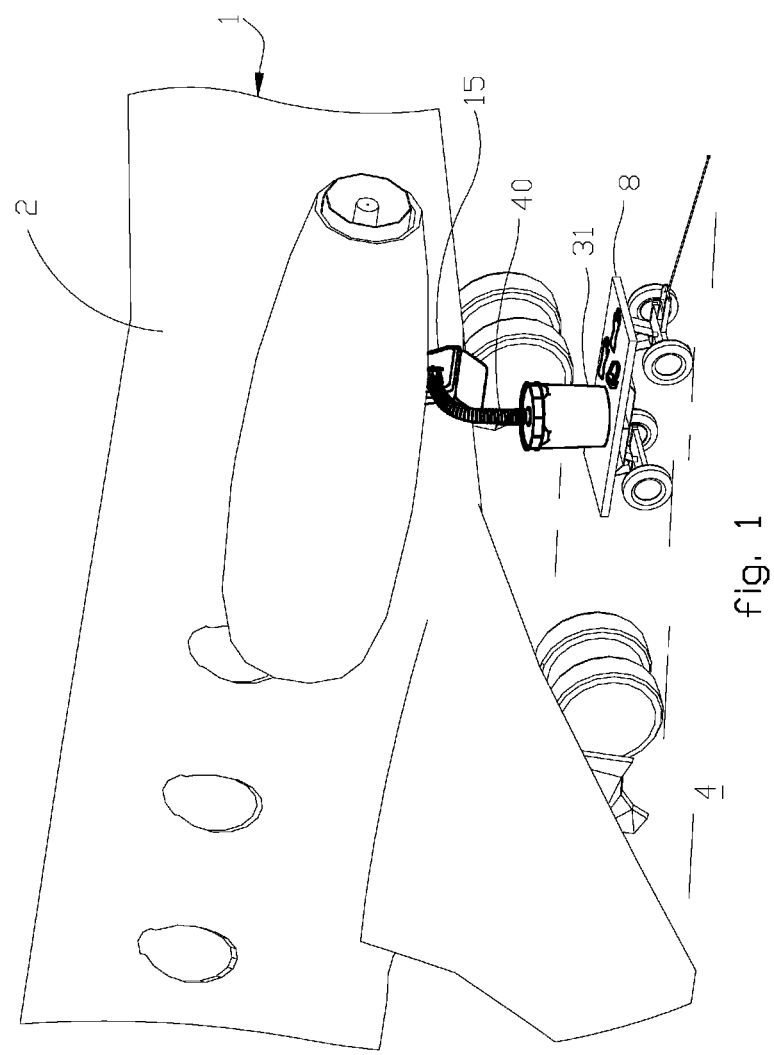
FIG. 1 shows a private aircraft with the present invention coupled to the onboard lavatory clean-out port.

Referring now to the figures, and particularly to FIGS. 1-4, private aircraft 1 includes fuselage 2 to which wings, propeller and landing gear are coupled according to conventional fixed wing aircraft design. One having ordinary skill in the art will recognize that aircraft 1 could comprise a helicopter or other, non-fixed wing vehicle, or even a land based vehicle such as a recreational vehicle ("RV") as long as it includes an onboard lavatory 10 for use by occupants without requiring the vehicle to stop and interrupt travel. Aircraft 1 is shown in FIG. 1 parked on an airport tarmac 4 or other landing strip where no lavatory service facilities are available, thereby potentially presenting a need for the present invention.

Aircraft lavatory 10 further comprises bowl 12 covered by seat 14 and coupled to holding tank 11 filled with disinfectant fluid 13. Tank 11 is disposed inside fuselage 2 of aircraft 1 and accessible from inside the cockpit or passenger cabin. Fluid 13 preferably comprises mostly fresh water in which some form of disinfectant of conventional composition (not shown) is dissolved. For obvious sanitary reasons, when lavatory 10 is used during flight, tank 11 periodically must be cleaned out and fluid 13 disposed of and replaced. Though small, private vehicles such as aircraft 1 fly relatively short flights, therefore not often needing clean-out services, such aircraft 1 are much more likely than larger aircraft to land at small airports and unmanned airstrips where local clean out services for lavatory 10 are unavailable. If the operator (not shown) of aircraft 1 does not wish to wait until aircraft 1 reaches an airport where service facilities are available, he must clean it out himself and dispose of and replace contaminated fluid 13. With the present invention, all he needs is access to fresh water and a restroom or other appropriate disposal means where contaminated fluid 13 may be dumped.

Clean out port 15 coupled to tank 11 provides access thereto from outside aircraft 1 while it rests on tarmac 4. Port door 16 covers port 15 during flight but may be opened to access drain 17. Removable cap 18 covers drain 17 to keep it sealed during pressure fluctuations of aircraft flight. Latch 19 is operable to open drain 17 and permit fluid 13 to flow under the force of gravity out of tank 11 and aircraft 1. Under most circumstances, fluid 13 would flow directly into above or below grade disposal tanks (not shown) such as those available to RV's in RV parks. Alternately, commercial service trailers or tanks (not shown) are brought to the side of aircraft 1 whereupon clean out services are rendered and contaminated fluid 13 hauled away for disposal.

Figure 5:
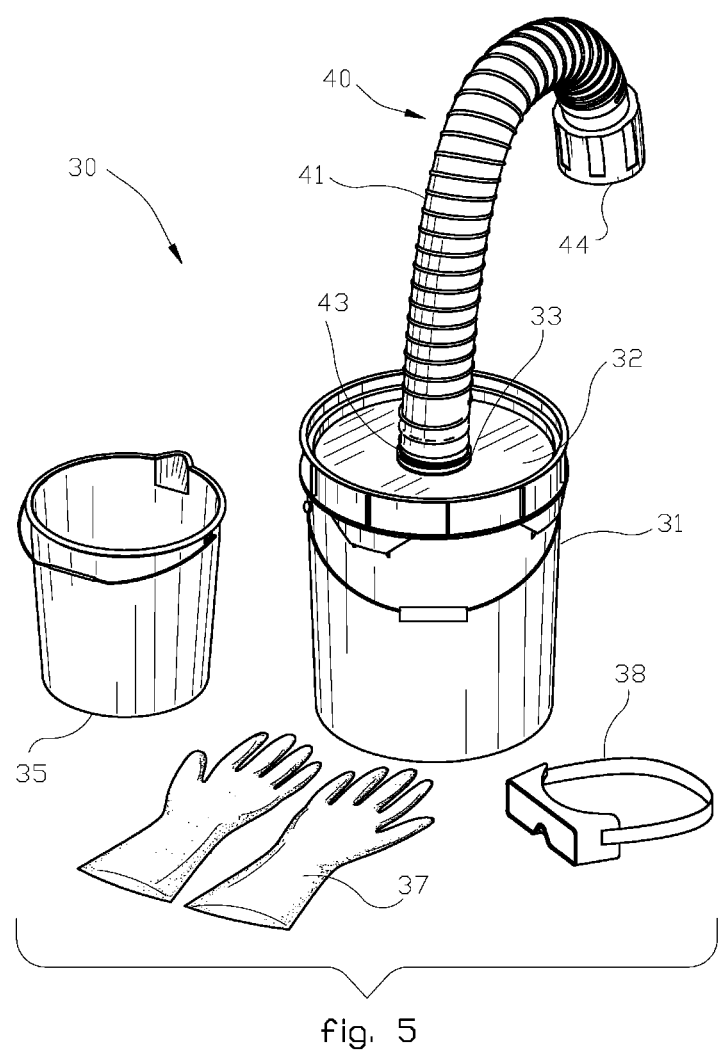
FIG. 5 details the present invention with its constituent contents disassembled in preparation storage.
Figures 6, 7:
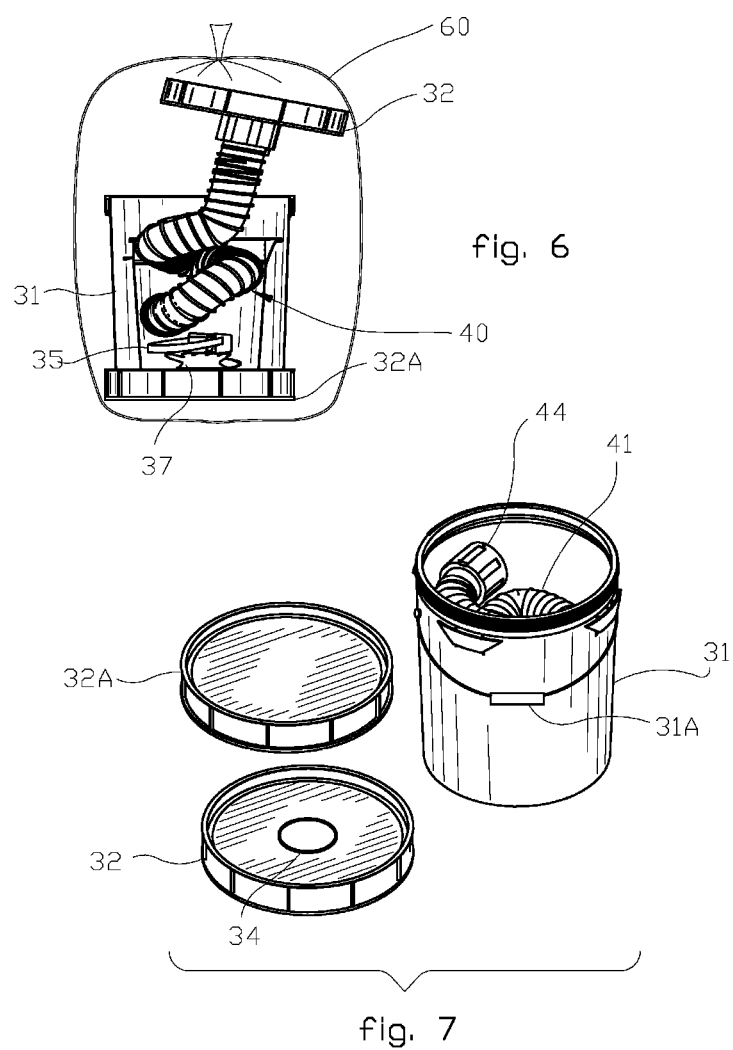
FIG. 6 shows the contents detailed in FIG. 5 assembled for storage on the aircraft of FIG. 1.
FIG. 7 depicts the present invention's constituent parts nested together for storage.

Turning now also to FIGS. 5-7, the present invention comprises a compact, light weight, self contained lavatory 10 service apparatus 30 which may be carried on aircraft 1 with minimal disruption to storage capacity and adding insubstantially to aircraft 1's net weight. It can be stowed in a convenient place on aircraft 1 such as a small alcove or storage closet (neither shown) and brought out only when needed, as discussed in more detail below.

Apparatus 30 comprises container 31 having drain lid 32 that couples to the proximate end of drain hose 40, the distal end of which couples to clean-out port 15 for directing fluid 13 from tank 11 into container 31. Drain lid 32 comprises a removable top that mates to container 31 around its perimeter such that container 31 remains sealed during the draining operation discussed below. A plurality of vents (not shown) may be provided through drain lid 32 to allow air to escape as fluid 13 fills container 31, but one having ordinary skill in the art will recognize that such vents are unnecessary in most cases as air may escape container 31 through hose 40. Drain lid 32 thus retains fluid 13 within container 31 during the draining operation. Apparatus 30 also includes sealing lid 32A (FIGS. 6, 7) as means for sealing container 31 while fluid 13 is transported away from aircraft 1 for disposal. Sealing lid 32A may be simply another lid 32 without hose aperture 34, or it may be any other sealing means for trapping fluid 13 and any volatile gasses which might evaporate therefrom, during disposal.

Figure 4:
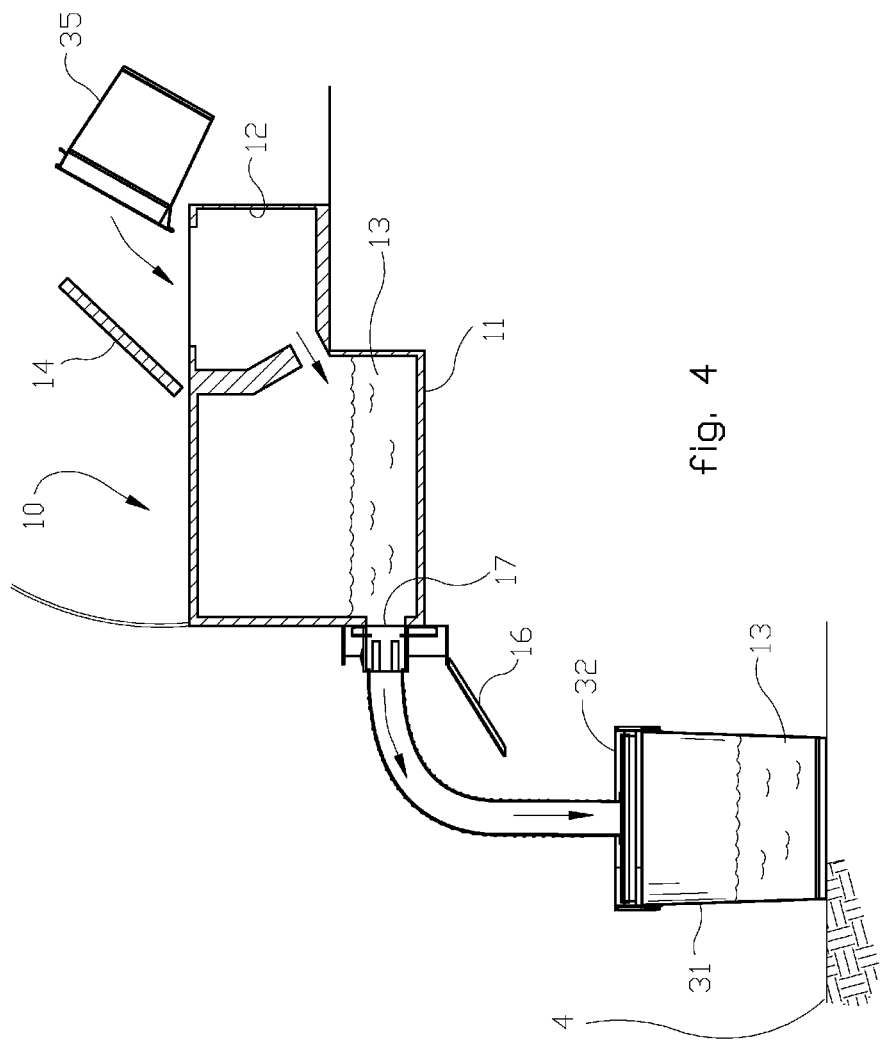
FIG. 4 depicts in cross section the lavatory onboard the aircraft and the present invention in use according to its intended purpose.

Drain hose 40 comprises flexible tube 41 which may be manipulated into a variety of angles and arcs to span from clean out port 15 to container 31 while the latter sits near aircraft 1 on a convenient platform such as cart 8 (FIG. 1) or directly upon tarmac 4 (FIG. 4). Tube 41 mates with container 31 through PVC coupling 33 permanently installed into drain lid 32. Preferably, coupling 33 comprises a conventional PVC pipe coupling generally available which fills aperture 34 through drain lid 32 and mates with tube 41 by conventional means (not shown).

On the opposite end of tube 41, clean out coupling 44 on hose 40 mates with drain 17 once cap 18 is removed therefrom. Conventionally, drain 17 also includes a valve (not shown) operable using latch 19 to release fluid 13 once hose 40 is installed and aircraft 1's operator is ready to service lavatory 10.

Tube 41 preferably is approximately four (4") inches in diameter and approximately three (3) feet long, though one having ordinary skill in the art will recognize that the length and size of tube 41 may vary according to the size and make of aircraft 1 and the location thereon of clean out port 15. Preferably, tube 41 comprises a flexible, collapsible hose made from a light weight, waterproof material such as sheet PVC or rubber impervious to any caustic effects of fluid 13, whether or not contaminated from use. A suitable tube 41 comprises catalog no. Lavine 3BL available from Sales Parts Plus Company of Melville, N.Y. Container 31 and companion container lids 32, 32A may be custom designed, for example to fit specific spaces within aircraft 1, but preferably container 31 is a substantially cylindrical, light-weight bucket, such as a plastic five gallon paint can, outfitted with lids 32, 32A, the former modified to include aperture 34.

Drain coupling 44 must match drain 17 on aircraft 1, and is generally available for each type of drain 17 commonly utilized on private aircraft. A suitable drain coupling 44 is available as catalog no. V1LS1J015ACU from Airlinx, Inc. of Newport Beach, Calif. Coupling 44 may be larger or smaller than tube 41 and may require a reducing fitting (not shown) to mate with tube 41. One having ordinary skill in the art will recognize that all such variations are considered to be within the spirit and scope of the present invention.

Bucket 35 comprises a rinse chamber which provides means for obtaining fresh water and introducing it into tank 11 through bowl 12, as shown in FIG. 4, after fluid 13 has been drained into container 13. Said fresh water rinses out bowl 12 and tank 11, also flowing into container 31 to be disposed of along with contaminated fluid 13. Bucket 35 also may be used to dissolve disinfectant tablets (not shown) in a quantity of fresh water to create a fresh supply of fluid 13 to introduce into tank 11 after latch 19 is closed again. One having ordinary skill in the art will recognize that bucket 35 may comprise a removable rinse chamber integral with and entirely nested within container 31, as further discussed below.

Apparatus 30 preferably is completely self-contained and may be stored compactly aboard aircraft 1. Most of its components fit within the envelope formed by container 31, thereby forming a kit, but one having ordinary skill in the art will recognize that apparatus 30 may come in several forms and serve the purpose of the present invention. Bucket 35 fits inside container 31 with its mouth recessed within the inside diameter of container 31. Bucket 35 preferably is not coextensive with the interior of container 31, but is more conically shaped so that a storage cavity between the lower portion of bucket 35 and container 31 may contain other, small parts of apparatus 30, such as a supply of disinfectant tablets or towels (not shown), goggles 38 and gloves 37. Bucket 35 is chosen also to have a large enough interior to hold hose 40 which preferably is coiled up and inserted into bucket 35 within container 31 and with drain lid 32 still attached (FIG. 6). Separate storage bag 60 loosely surrounds and encloses apparatus 30 for storage on aircraft 1. Container 31 sits atop sealing lid 32A within bag 60, while drain lid 32 sits upside down and loosely atop container 31 with hose 40 still coupled to it. NOTE: one having ordinary skill in the art will recognize that container 31 preferably is not sealed, e.g. with lid 32A, during storage in order to avoid air pressure differentials during flight.

In operation, aircraft 1's operator (not shown) parks aircraft 1 on tarmac 4 as near as practicable to restroom facilities or a sanitary dump site (neither shown) at the landing strip (not shown) for tarmac 4. The operator then retrieves apparatus 30 from its storage location (not shown) within aircraft 1, removes it from bag 60 and places it on tarmac 4 near clean out port 15. He then opens container lid 32 and removes the contents of apparatus 30, placing them in a convenient location such as atop one of the wings of aircraft 1 or simply on tarmac 4 beside container 31. He then stretches hose 40 tentatively between port 15 and container 31 to be sure it reaches, and adjusts the location of container 31 accordingly. He then places container lid 32 atop container 31 and seals it in place. Next, the operator opens port door 16 and couples hose coupling 44 onto drain 17, typically by spinning its collar until hose 40 is tightly secured.

To drain tank 11, the operator opens latch 19 and waits until fluid 13 gravity feeds from tank 11 into container 31. Once tank 11 is substantially empty, the operator obtains fresh water in bucket 35, enters aircraft 1 and pours it through bowl 12 into tank 11, allowing it to flow into container 31 through hose 40. The operator may or may not include a quantity of detergent or other cleaning agent (not shown) in this flushing operation, and he may repeat this flushing step as many times with as much clean water as he feels he needs and which can be held by container 31 along with the contaminated fluid 13.

Once the operator has adequately cleaned lavatory 10 in this fashion, he exits aircraft 1 and closes latch 19 to reseal lavatory 10. He then decouples hose 40 from drain 17 and closes door 16, removing drain lid 32 from container 31 and laying it aside with hose 40 still attached. Next, he seals container 31 with sealing lid 32A and transports container 31 to a dump site to dispose of contaminated fluid 13. He also obtains another quantity of fresh water in bucket 35, re-enters aircraft 1 and pours the water into tank 11. He then drops one or more disinfectant tablets 39 into tank 11 to dissolve in the water and create a fresh quantity of fluid 13, thereby readying lavatory 10 for another flight.

To store apparatus 30 for the next flight, the operator rinses out container 31 and hose 40, and, if need be, allows them to air dry while he goes about other flight preparations. The operator first inserts bucket 35 into container 31, bottom down so that the interior of bucket 35 is open and accessible from outside container 31. He coils up hose 40 and places it into container 31, preferably nested within bucket 35, with drain lid 32 loosely positioned upside down atop container 31 He also places gloves 37, goggles 38, disinfectant tablets, towels and other supplies (not shown) in a convenient cavity either within bucket 35, outside bucket 35 but within container 31, or outside container 31 but within bag 60 See FIG. 6. Finally, he places sealing lid 32A into bag 60 with container 31 sitting atop it and loosely draws bag 60 around apparatus 30 it as shown in FIG. 6. He then stows apparatus 30 in bag 60 in a convenient location within aircraft 1 for flight.

Thus, apparatus 30 provides the operator of aircraft 1 with convenient means for cleaning lavatory 10 when commercial services are not available. Especially in kit form, apparatus 30 is small and light weight enough that it may be carried on aircraft 1 without concern for need of substantial storage space or significant weight increase in aircraft 1. Apparatus 30 can be assembled in part from readily available components such as bucket 35, gloves 37 and goggles 38, the latter two of which may already be present on aircraft 1. Container 31 with lids 32, 32A may be custom designed for the purposes described above, or preferably just selected from a number of preexisting containers such as five gallon paint cans modified as discussed above. Hose 40 is specialized by its ability to mate with drain 17 using appropriate size and threads for drain 17.

While the invention has been particularly shown and described with reference to preferred and alternate embodiments, it will be understood by those skilled in the art that various changes in form and detail may be made therein without departing from the spirit and scope of the invention. For example, though apparatus 30 is depicted and discussed as containing one bucket 35, it could contain several which would nest within one another (not shown) and still fit within container 31. Likewise, apparatus 30 could include multiple containers 31 for larger aircraft 1, each nesting within one another (not shown) similarly to the manner in which bucket 35 nests within container 31 as shown in FIG. 6.

Further, though the present invention has been discussed within the context of comparatively small, private aircraft big enough to have onboard, built-in lavatories, the invention could be useful for larger aircraft as well as for smaller, personal aircraft with portable but non-built-in lavatories aboard.

I claim:

1. A lavatory service apparatus for a vehicle having an onboard lavatory, the lavatory service apparatus comprising
   at least one reservoir container, each of said at least one reservoir containers having substantially cylindrical walls extending between a closed reservoir container bottom and an open reservoir container mouth and defining at least one reservoir container interior, said reservoir container bottom having a reservoir container bottom diameter;
   a drain lid adapted to couple to the open reservoir container mouth, said drain lid surrounding and defining a drain aperture communicating through said drain lid into said at least one reservoir container interior, the drain lid further having a hose coupling journaled within said drain aperture;
   a tubular drain hose coupled to said hose coupling by a proximate hose end and extending to a distal hose end bearing a drain coupling adapted to couple to said onboard lavatory; and
   at least one rinse chamber; each one of said at least one rinse chamber having
      conical rinse chamber walls diverging upwardly between a rinse chamber bottom and a rinse chamber mouth, said rinse chamber bottom having a rinse chamber bottom diameter smaller than said reservoir container bottom diameter, said rinse chamber being adapted to journal within one of said at least one reservoir container interior with said rinse chamber bottom juxtaposed said reservoir container bottom and said rinse chamber walls displaced a spaced distance inside the cylindrical walls to create storage cavities between the at least one rinse chamber and the cylindrical walls.

2. The lavatory service apparatus of claim 1 wherein the at least one rinse chamber is
   separable from said at least one reservoir container; and
   adapted to nest entirely within said at least one reservoir container interior.

3. The lavatory service apparatus of claim 1 and further comprising
   sealing means for sealing the open mouth and retaining contents of the at least one reservoir container within the reservoir container interior.

4. The lavatory service apparatus of claim 3 wherein the sealing means comprises
   a removable top congruent with the drain lid but having no drain aperture.

5. The lavatory service apparatus of claim 1 and further comprising
   storage bag means for
      loosely surrounding and containing said lavatory service apparatus while stored within said vehicle; and
      capturing moisture and other contaminants which may linger on the lavatory service apparatus after servicing the lavatory.

6. A lavatory service kit for a vehicle having an onboard lavatory, the lavatory service kit comprising
   a reservoir container having substantially cylindrical walls extending between a closed bottom and an open mouth and defining a reservoir container interior;
   a removable drain lid adapted to couple to the open mouth and having
      a hose coupling disposed in an upper surface of said removable top and communicating with said reservoir container interior through said removable top; and sealing means for sealing the reservoir container interior;
a tubular drain hose coupled to said hose coupling by a proximate hose end and extending to a distal hose end bearing a drain coupling adapted to couple to said onboard lavatory;
a rinse bucket adapted to
nest entirely within said reservoir container interior, said rinse bucket disposed on said closed bottom and having rinse bucket walls disposed a spaced distance from said cylindrical walls to create storage cavities between said rinse bucket walls and said cylindrical walls, said storage cavities adapted to contain service supplies and service apparatus; and
carry rinse water and for preparing replacement disinfectant fluid for the lavatory; and
a storage bag adapted to loosely surround and containing said lavatory service kit while stored within said vehicle and to capture moisture and other contaminants which may linger on the lavatory service apparatus after servicing the lavatory.

7. The lavatory service apparatus of claim 6 wherein the service apparatus comprises
gloves and goggles adapted to be enclosed within said storage cavities.

8. The lavatory service apparatus of claim 6 wherein the service supplies comprise
a plurality of disposable towels; and
disinfectant tablets adapted to be dissolved in the rinse water for creating said replacement disinfectant fluid, said towels and disinfectant tablets adapted to be enclosed within said storage cavities.

9. An improved method of servicing an onboard lavatory for a vehicle having an interior in which said onboard lavatory is disposed and an exterior, said vehicle further having a clean out port disposed on its exterior and coupled to said onboard lavatory, the improved method comprising
providing a lavatory servicing kit having
a reservoir container having substantially cylindrical walls extending between a closed bottom and an open mouth and defining a reservoir container interior;
a first removable top adapted to couple to the open mouth and having
a hose coupling disposed in an upper surface of said removable top and communicating with said reservoir container interior through said removable top; and
a second removable top adapted to seal the reservoir container interior;
a tubular drain hose coupled to said hose coupling by a proximate hose end and extending to a distal hose end bearing a drain coupling adapted to couple to said clean out port;
a rinse bucket adapted to
nest entirely within said reservoir container interior;
create storage cavities between said rinse bucket and said cylindrical walls, said storage cavities adapted to contain service supplies and service apparatus; and
carry rinse water and for preparing replacement disinfectant fluid for the lavatory; and
a storage bag adapted to loosely surround and containing said lavatory service kit; then
disposing said vehicle near a source of water; then
transporting said rinse bucket to said source of water and filling it with a select volume of water and returning it to said vehicle;
removing said storage bag, containing said lavatory servicing kit, from said vehicle; then
removing said lavatory servicing kit from said storage bag; and
positioning said lavatory servicing kit adjacent said exterior of said vehicle near said clean out port; then
coupling said drain coupling to said clean out port; then
coupling said first removable top to said open mouth; then
opening said clean out port to discharge used disinfectant fluid within said onboard lavatory into said interior of said reservoir container; then
pouring at least a portion of said select volume of water in said rinse bucket into said onboard lavatory and allowing it to drain through said onboard lavatory and into said reservoir container interior; then
closing said clean out port and decoupling said drain coupling from said clean out port;
replacing said first removable top with said second removable top on said open mouth; then
transporting said reservoir container to a disposal location for said used disinfectant fluid; then
disposing of said used disinfectant fluid at said disposal location; then
transporting said reservoir container back to said vehicle; and
restoring said lavatory servicing kit to said storage bag; then
stowing said storage bag onboard said vehicle for future use.

10. The improved method of claim 9 and further comprising between the closing step and the restoring step,
mixing at least one disinfecting tablet with a remainder of said water contained in said rinse bucket after the pouring step to create a select volume of fresh disinfecting fluid; and then
introducing said fresh disinfecting fluid into said onboard lavatory.

11. The improved method of claim 9 and further comprising before the restoring step,
nesting the rinse bucket within the reservoir container interior; then
coiling the drain hose and nesting it within the rinse bucket with the first removable top disposed above the open mouth; and
disposing the second removable top beneath the reservoir container bottom.

* * * * *